(12) United States Patent
Shur et al.

(10) Patent No.: US 11,511,732 B2
(45) Date of Patent: Nov. 29, 2022

(54) SYSTEM AND METHOD FOR PREVENTING ROLLING-OVER OF VEHICLES

(71) Applicant: INTSITE LTD., Haifa (IL)

(72) Inventors: Or Shur, K.Tivon (IL); Tzach Ram-On, Haifa (IL); Mor Ram-On, Haifa (IL)

(73) Assignee: INTSITE LTD., Haifa (IL)

( * ) Notice: Subject to any disclaimer, the term of this patent is extended or adjusted under 35 U.S.C. 154(b) by 148 days.

(21) Appl. No.: 16/697,374

(22) Filed: Nov. 27, 2019

(65) Prior Publication Data

US 2020/0172087 A1 Jun. 4, 2020

Related U.S. Application Data

(60) Provisional application No. 62/772,683, filed on Nov. 29, 2018.

(51) Int. Cl.
*B60W 30/04* (2006.01)
*B60W 40/13* (2012.01)

(52) U.S. Cl.
CPC ..... *B60W 30/04* (2013.01); *B60W 2040/1315* (2013.01); *B60W 2420/42* (2013.01)

(58) Field of Classification Search
CPC ............... B60W 30/04; B60W 20/1315
See application file for complete search history.

(56) References Cited

U.S. PATENT DOCUMENTS

| | | | | |
|---|---|---|---|---|
| 10,427,788 B1* | 10/2019 | Grenga | ............... | B64D 1/14 |
| 2003/0163231 A1* | 8/2003 | Meyers | ............... | B60T 8/243 |
| | | | | 701/1 |
| 2013/0201053 A1* | 8/2013 | Saing | ............... | B60R 16/03 |
| | | | | 342/71 |
| 2014/0005914 A1* | 1/2014 | Bernzen | ............. | F02N 11/0833 |
| | | | | 701/112 |
| 2018/0100779 A1* | 4/2018 | Steinlage | ............ | B60W 40/13 |
| 2018/0229988 A1* | 8/2018 | Gault | ............... | B66F 17/003 |

(Continued)

FOREIGN PATENT DOCUMENTS

| | | |
|---|---|---|
| CN | 105971050 | 9/2016 |
| GB | 2558251 | 7/2018 |
| JP | 2016-172963 | 9/2016 |

OTHER PUBLICATIONS

European Search Report of Application No. EP 19212293 dated Mar. 31, 2020.

*Primary Examiner* — Jess Whittington
(74) *Attorney, Agent, or Firm* — The Roy Gross Law Firm, LLC; Roy Gross (57) ABSTRACT

A system for preventing rolling-over of vehicles is disclosed: The system may include: at least one camera attached to a portion of the vehicle such that images capture by the camera include a portion of the vehicle and a portion of a surrounding area; a communication module; and a controller configured to: receive from the camera, via the communication module, at least one image; receive data related to the parameters of the vehicle; calculate a relative position between the vehicle and a ground based on the received at least one image; calculate a location of the vehicle's center of gravity based on the received at least one image and the data related to the parameters of the vehicle; and determine a probability of rolling-over the vehicle based on the calculated center of gravity and the relative position.

19 Claims, 4 Drawing Sheets

(56) References Cited

U.S. PATENT DOCUMENTS

2020/0032488 A1* 1/2020 Kean .................... B60W 50/08
2020/0240114 A1* 7/2020 Yamamoto ............ E02F 9/2225
2020/0340208 A1* 10/2020 Kitajima ................ B66C 13/18
2021/0214919 A1* 7/2021 Okada ...................... E02F 3/32
2021/0246626 A1* 8/2021 Yamamoto ............. G08B 21/24

* cited by examiner

SYSTEM AND METHOD FOR PREVENTING ROLLING-OVER OF VEHICLES

CROSS REFERENCE TO RELATED APPLICATIONS

This application claims the benefit of U.S. Provisional Application No. 62/772,683, filed on Nov. 29, 2018 and entitled SYSTEM AND METHOD FOR PREVENTING ROLLING-OVER OF VEHICLES, which is incorporated in its entirety herein by reference.

FIELD OF THE INVENTION

The present invention generally relates to a system for preventing rolling over of vehicles. More particularly, the present invention relates to systems and methods for preventing rolling over of vehicles using image analysis.

BACKGROUND OF THE INVENTION

Rolling over, also known in the art as rollover or tipping over of vehicles, is the reason for a great number of accidents in working sites where the terrain and grounds are uneven, sloppy and bumpy. Vehicles (e.g., trucks) and heavy machinery (e.g., bulldozers, excavator, backhoes, backhoe loaders and the like) or any other vehicles involved in excavation or other earth-moving related tasks are subject to rolling over. Vehicles having a vehicle's motility unit part and a task-performing unit for carrying loads are more sensitive for rolling over since the location of the task-performing unit carrying the load dynamically changes the center of gravity (CoG) of the vehicle. For example, when backhoe/excavator shovels/digs the earth using a digging bucket located at the end of a two-part articulated arm, the CoG of the backhoe changes as the digging bucket moves from the digging location to the dropping location, often when the vehicle's motility unit of the backhoe/excavator is in motion (e.g., the vehicle's motility unit (the tractor, a half-track and the like) carrying the two-part articulated arm). Similar problems may occur in the operation of bulldozers and other heavy machinery.

The current solutions aim to detect possible rollover scenarios and alert the operator and/or actively intervene with the equipment operation in order to prevent a rollover. Current protection systems are either completely passive, i.e., aimed to protect the operator in case of rollover but not to prevent it, such as an airbag. Alternatively, such system may include or require a range of dedicated sensors, selected for a particular vehicle, in order to estimate the vehicle's posture, which in turn makes it hard to scale to different vehicles and to add additional safety features on the same platform.

Accordingly, there is a need for a standalone system, that can be assembled in a variety of different vehicles, capable of predicting the probability of rolling over without the need to integrate the sensors into the vehicle or use the vehicle's sensors.

SUMMARY OF THE INVENTION

Aspects of the invention may be directed to a system and a method of preventing rolling-over of vehicles. The system may include at least one camera attached to a portion of the vehicle such that images captured by the camera include a portion of the vehicle and a portion of a surrounding area; a communication unit; and a controller configured to perform the following method: receiving from the camera, via the communication unit, at least one image; receiving data related to the parameters of the vehicle; calculating a relative position between the vehicle and a ground based on the received at least one image; calculating a location and/or velocity of the vehicle's center of gravity based on the received at least one image and the data related to the dimensions of the vehicle; and determining a probability of rolling-over the vehicle based on the calculated center of gravity and the relative position.

In some embodiments, the received at least one image may further include a portion of a load carried by the vehicle and the received parameters include parameters related to the load. In some embodiments, the vehicle's parameters may include at least one of: dimensions of the vehicle, dimensions of a load carried by the vehicle, a moment of inertia of the vehicle, mass of each part of the vehicle, motor parameters, a mathematical model representing the dynamics between inputs and output of the dynamic elements of the vehicle and the like.

In some embodiments, the controller may further be configured to: receive a stream of images from the at least one camera, while at least a portion of the vehicle is in motion; identify temporal changes in at least one of: the relative position and the location of the vehicle's center of gravity, the relative posture of the vehicle and the position and posture of a load carried by the vehicle; determine the probability of rolling-over of the vehicle based on the temporal changes; and prevent the vehicle from rolling-over if the probability is higher than a threshold value. In some embodiments, the controller may further be configured to: calculate the location of the center of gravity from the analyzed images by: estimating a posture of the vehicle; receive data related to parameters of the vehicle; and estimating a payload mass of the vehicle.

In some embodiments, the controller may further be configured to: calculate the relative position between the vehicle and a ground from the analyzed images by: determining a tilting angle of the vehicle with respect the ground; and calculating the swing angle. In some embodiments, the controller may further be configured to: determine the probability of rolling-over the vehicle based on data received from one or more sensors. In some embodiments, the sensor may a gyroscope and the controller may further be configured to calculate the relative position between the vehicle and a ground based on reading received from the gyroscope.

In some embodiments, the at least one camera may be located on the vehicle's motility unit. In some embodiments, the at least one camera may be located at a known location on the vehicle. In some embodiments, the controller may further be configured to: estimate a distance of the vehicle from an obstacle. In some embodiments, the controller may further be configured to: detect the activity of a user operating the vehicle. In some embodiments, the controller may further be configured to: detect objects close to the vehicle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic, GPUs and the like) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Some aspects of the invention may be direct to a stand-alone device or system that can be attached/assembled to any vehicle in order to prevent the rollover of the vehicle. The stand-alone device or system according to embodiments of the invention may be configured to ensure the safety of the traveling of the vehicle in a working site. As used herein the word "site" may be directed to any working site having, uneven, sloppy and/or bumpy ground and terrains, for example, a construction site, a mine, a port, logistical warehouses, agricultural sites, an airport, a civil engineering project and the like.

Such a system may include a camera located on the vehicle in a selected position, such that images taken by the camera may capture at least a portion of the vehicle, a portion of a load if the vehicle carries a load and a portion of a surrounding area. The system may further include a controller configured to calculate based on the captured images the probability for rolling over of the vehicle. In some embodiments, if the probability for rolling over is higher than a predetermined value, the system may alert the operator or instruct the vehicle's controller to move the vehicle and/or any of the vehicle's parts in order to prevent the rollover.

As used herein a vehicle may include any motor driven vehicle, running on wheels, caterpillar tracks (continuous track) or a combination thereof (e.g., half-track). A vehicle according to embodiments of the invention may include a vehicle's motility unit (e.g., an undercarriage) that is configured to stay in contact with the ground/road on which the vehicle rides and a task-performing unit (e.g., an articulated arm located on a rotating platform) that is configured to move with respect to the vehicle's motility unit, when the vehicle is stationary and/or in motion. Examples for vehicles according to embodiments of the invention may include, trucks, semitrailers, wheel-loaders, excavators, bulldozers, tractors, backhoes, backhoe loaders, forklifts and the like.

Figure 1:
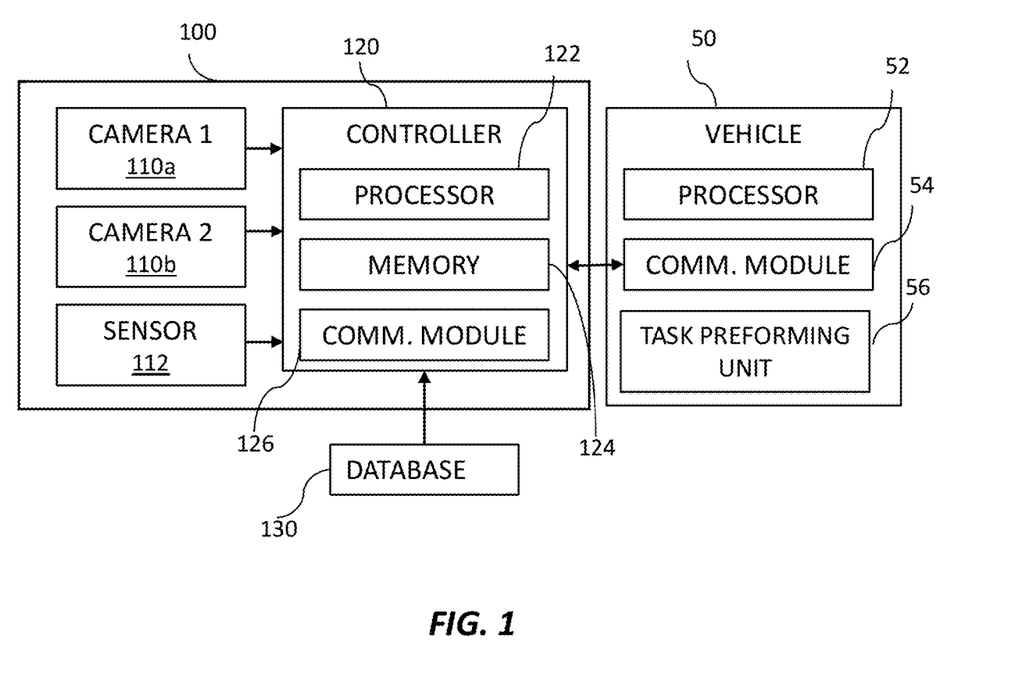
FIG. 1 shows a block diagram of a system for preventing rolling-over of vehicles, according to some embodiments of the invention.

Reference is now made to FIG. 1 which is a high-level block diagram of a system 100 for preventing rolling-over of vehicles according to some embodiments of the invention. System 100 for preventing rolling-over of vehicles may include at least one camera 110a and/or camera 110b and at least one controller 120. At least one camera 110a and/or camera 110b may be configured to be attached to a vehicle 50 at a location which allows camera 110 to capture images of at least a portion of vehicle 50 (e.g., apportion of task-performing unit 56) and at least a portion of a site at which vehicle 50 is operating. Camera 110a and/or 110b may be any image capturing device, that may capture images in real time, in visible light, infra-red or any other suitable wavelength, for example, thermal camera, stereo camera, monocular camera, depth camera. At least one camera 110a and/or 110b may capture discreate (e.g., single) images or may film a stream of images (e.g., a video). In some embodiments, camera 110a and/or camera 110b may be configured to send the captured images, to at least one controller 120 via a communication module 126, either wirelessly or be wired communication.

In some embodiments, at least one camera 110a and/or 110b may be located on a part of vehicle 50 that may allow camera 110 to capture at least a portion of the surrounding area and a portion of vehicle 50 in the same frame. For example, the camera may be attached to vehicle's motility unit, for example, on the on the frame-head of the operator's cabin. In some embodiments, two or more cameras 110a and 110b may be located at different locations (e.g., parts) on vehicle 50, for example, from two different sides of the frame-head of vehicle 50, as to allow capturing images from different angles. In some embodiments, at least one camera 110a and/or 110b may be located or assembled on an arm or a pivot. In some embodiments, the arm or pivot may include a motor configured to move camera 110a and/or 110b as to allow camera 110a and/or 110b to capture images from different angles.

In some embodiments, at least one camera 110a and/or 110b may be in communication (either wired or wirelessly)

with at least one controller 120. Controller 120 may include a processor 122 that may be any processing unit (e.g., a chip, GPU, Soc, FPGA ASIC and the like) configured to process data (e.g., videos) and execute instructions, a memory 124 for storing instructions and/or data and a communication module 126 for communicating with other devices. Communication module 126 may include a wired and/or wireless network interface card (NIC).

Memory 124 may include codes and/or instructions of methods according to some embodiments of the invention, for example, a method of preventing rolling-over of vehicles. Memory 124 may be a computer or processor non-transitory readable medium, or a computer non-transitory storage medium. In some embodiments, controller 120 may be in communication or may include a local or cloud database 130.

Database 130 may store data related to the parameters of the vehicle, received for example, from the manufactures. The data may include, the size and weight of each portion (e.g., arms, vehicle's motility unit, digging bucket, etc.) of vehicle 50. Database 130 may further store data associated with the site or sites, for example, two-dimensional (2D) and/or three-dimensional (3D) plans of the site (e.g., of the buildings), the two-dimensional (2D) and/or three-dimensional (3D) terrain of the site in manners of point cloud or any other representation, the type of soil (its specific density) and land in the site, and the like. Communication module 126 may include any module or modules for wireless and wired communication with, at least one camera 110a and/or 110b, a processor 52 controlling vehicle 50, database 130 or any other external computerized device.

In some embodiments, system 100 may further include one or more sensors 112 for providing additional data to controller 120. One or more sensors 112 may be located or attached to vehicle 50 or elsewhere in the site. One or more sensors 112 may be selected from a group consisting of: gyroscope, Light Detection and Ranging (LIDAR) sensor, Global Positioning System (GPS), Inertial Measurement Unit (IMU), Barometer, RF detector, Laser Detector, Ultrasonic sensor, microphone, temperature and humidity sensor, accelerometer, IR camera, stereo camera, Encoders, proximity sensor and the like.

In some embodiments, vehicle 50 may include a task-performing unit 56 (e.g., with respect to other parts of vehicle 50), for example, the two-part articulated arm of an excavator may be regarded as the task-performing unit. Such two-part articulated arm may be configured to articulately move in order to dig. In some excavators the two-part articulated arm may be connected to an undercarriage by way of a center pin allowing the arm to slew 360° unhindered. In some embodiments, vehicle 50 may include a stationary portion (not illustrated), configured to support the task-performing unit, for example, a tractor, a continuous track or a half track, carrying the two-part articulated arm.

In some embodiments, vehicle 50 may include a communication module 54 for communicating wirelessly with system 100, for example, via communication module 126. For example, communication module 54 may include a cellular transmitter or modem, a Wi-Fi communication unit, a satellite communication unit or the like for communicating with remote devices via a communication network, such as, for example, the Internet. In some embodiments, communication module 54 may include an interface unit for communicating with processor 52 of vehicle 50.

Figure 2:
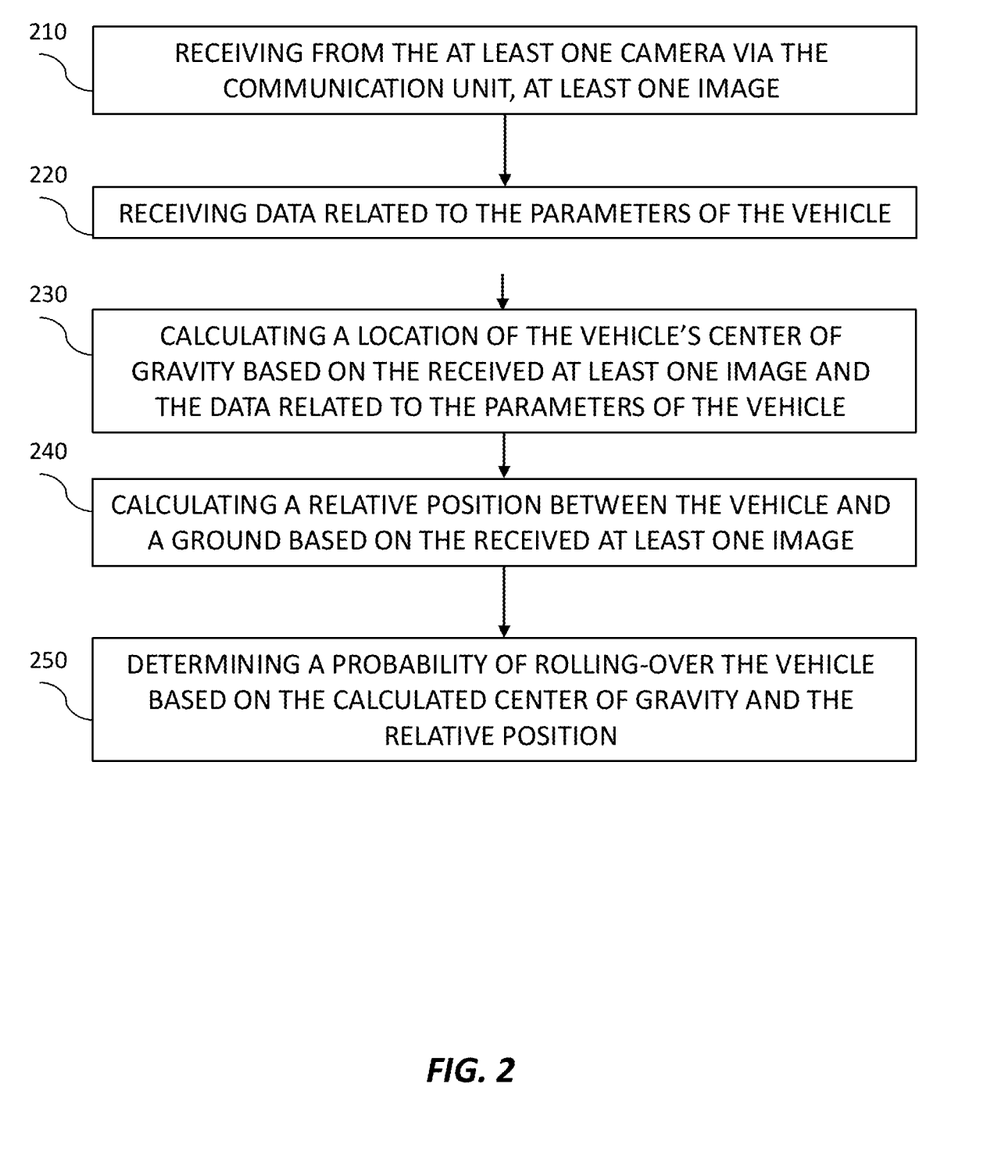
FIG. 2 is a flowchart of a method of preventing rolling-over of vehicles according to some embodiments of the invention.

Reference is now made to FIG. 2 which is a flowchart of a method of preventing rolling-over of vehicles according to some embodiments of the invention. The method of FIG. 2 may be performed by controller 120 of system 100 or by any other suitable controller. In step 210, at least one image may be received from at least one camera. In some embodiments, the at least one image may include a portion of the vehicle and a portion of a surrounding area, captured in the same frame. For example, camera 110a located on the frame-head of the operator's cabin in an excavator may capture an image showing the two-part articulate arm, the digging bucket and an area located at the background of the bucket. In some embodiments, controller 120 may receive a stream of images (e.g., a video), for example, when vehicle 50 is in motion and/or when task-performing unit 56 is moving (e.g., digging). In some embodiments, the stream of images may be received from different angles when camera 110a is configured to pivotally move. In some embodiments, two or more images may be received from two different cameras, for example, cameras 110a and 110b located at different locations on vehicle 50.

In step 220, data related to the parameters of the vehicle may be received, for example, from database 130 or from any other database or from image analysis of the image or stream of images received from camera 110a and/or camera 110b. In some embodiments, the vehicle's parameters comprise at least one of: dimensions of the vehicle, dimensions of a load carried by the vehicle, a moment of inertia of the vehicle, mass of each part, motors parameters, the plant of the vehicle (a mathematical model representing the dynamics between the inputs and the output of the dynamic system). For example, data related to the parameters of the vehicle provided by the manufacturer of vehicle 50 may be stored in database 130. For example, for an excavator the data may include dimensions, such as, the length and cross section of each branch in the articulate arm, the weight of each arm, the CoG of the vehicle's motility unit, the size and volume of the digging bucket and the like. In yet another example, for a truck the data may include the CoG of the vehicle's motility unit that includes, inter alia: the cab, the engine and the drivetrain and may further include the size and volume of an open-box bed included in a dump truck.

In some embodiments, the data related to the parameters of the vehicle may be received from image analysis of the image or stream of images received from camera 110a and/or camera 110b. For example, any known image analysis method may be used to analyze the image or stream of images received from camera 110a and/or camera 110b in order to retrieve the dimensions of the vehicle. In some embodiments, vehicle 50, may carry a load, accordingly the data related to the parameters of the vehicle may further include data related to the parameters of the load which may be received from a debase, inserted by a user via a user interface or may be received from image analysis of the image or stream of images received from camera 110a and/or camera 110b.

Figure 3A:
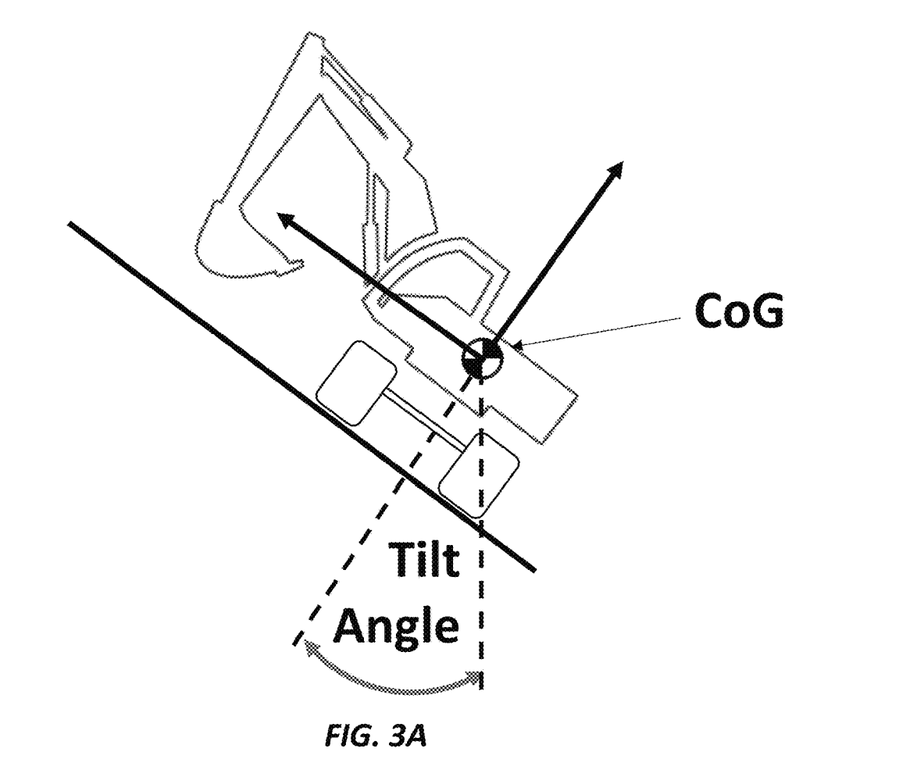
FIGS. 3A-3B are illustration of a vehicle on a terrain and the forces acting on such a vehicle according to some embodiments of the invention.

In step 230, a location and/or the velocity of the vehicle's CoG may be calculated based on the received at least one image and the data related to the parameters of the vehicle. In some embodiments, controller 120 may be configured to receive the location of the CoG of vehicle's 50 motility unit from database 130. The controller may then estimate the posture of the vehicle, as illustrated in FIG. 3A and estimate the payload mass of the vehicle. The posture of task-performing unit 56 (e.g., the two-part articulated arm illustrated) relative to the fixed portion of vehicle 50 or relative to the ground may be estimated from the taken at least one image. The image comprising at a portion of task-preforming unit 56 may be taken from a camera located at a known position on the vehicle's 50 motility unit. From knowing the position of the camera, the dimensions of the task-performing unit and the at least one image taken by the camera the posture may be estimated. In some embodiments, controller 120 may be configured to calculate or estimate the velocity of the CoG based on a stream of images received from camera 110a and/or camera 110b or from a positioning sensor.

In some embodiments, controller 120 may estimate the payload mass of the vehicle from the received images using any known method. In some embodiments, the estimation may include two stages, estimating the volume of the payload mass following by estimating the weight of the payload mass. For example, the volume may be estimated using segmentation (or object detection) of the payload mass and the holding container, such that the estimation is conducted based on known maximum capacity of the container. In some embodiments, following the volume estimation the weight may be estimated using data related to the type of sand/earth/rocks located in the area. In another example, a learning algorithm may be used, based on previously collected data (e.g., measuring the payload mass using other methods and correlating between the measured payload mass and images of the payload taken by camera 110a). In some embodiments, the method may infer the volume directly from the image (e.g., using a regressor or a classifier, depending on the sufficient accuracy of the estimation).

In some embodiments, the estimated posture of the vehicle, the recited CoG of the vehicle's motility unit and the estimated payload mass may be used to calculate vehicle 50 current COG location. In some embodiments, if the vehicle is in motion and/or the task-performing unit of the vehicle is moving a stream of images may be required in order to determine temporal changes in the CoG location (e.g., calculating a time dependent CoG). The stream of images (e.g., a video) may be taken in real-time as the vehicle/task-performing unit are moving and may be used to calculate real-time temporal changes.

In step 240, a relative position between the vehicle and a ground may be calculated based on the received at least one image. For example, controller 120 may be configured to determining a tilting angle of the vehicle with respect to the ground, as illustrated in FIG. 3A. For example, for trucks, bulldozers etc. that may be regarded as rigid bodies, the tilt (e.g., pitch, roll, yaw angles) of vehicle's 50 motility unit may be defined as the angles between a normal to a grounding area passing through the CoG of vehicle 50 and a gravity vector passing through the CoG. In some embodiments, when vehicle 50 is in motion and/or task-performing unit 56 is moving, temporal changes in the relative position and the tilting angle may be identified from a stream of images (e.g., a video) taken in real-time as the vehicle/task-performing unit are moving.

In some embodiments, images of the task performing unit at various angles (between the limbs of the arm and the arm and the motility unit) and posture (of the motility unit and the aground) may be taken by camera 110a. The images may be correlated with measurements of the angles and the postures taken by other sensors, such as images taken when the camera is standing external to vehicle 50, geometrical measurements and the like. In some embodiment, the images and the corresponding measurements may be stored in s database 130 and may be provided in real-time, thus may allow an algorithm running on processor 122 to calculate from real-time images, tilting angle and posture.

In some embodiments, the relative position of the vehicle with respect to the ground may be determined based on a reading received from a sensor, such as a gyroscope (e.g., sensor 112). A gyroscope may be attached/assembled in a known location on the vehicle's 50 motility unit, for example, next to camera 110a. The gyroscope may provide the relative position of the vehicle with respect to the horizon line and images of the ground and/or topographical data may provide the tilting of the ground surface with respect to the horizon line.

In some embodiments, the relative position of the vehicle may be determined with respect to a fixed object located in the area. For example, at least one image captured by camera 110a may include a fixed object (e.g., a building, a pillar, etc.) having a known location, known dimensions and known inertia. Knowing the location of vehicle 50 (e.g., from a GPS sensor) with respect to the fixed object and the location of camera 110a on the fixed position of vehicle 50, controller 120 may determine an angle at which the image was taken with respect to the horizon line and derive the tilting angle of vehicle 50.

Figure 3B:
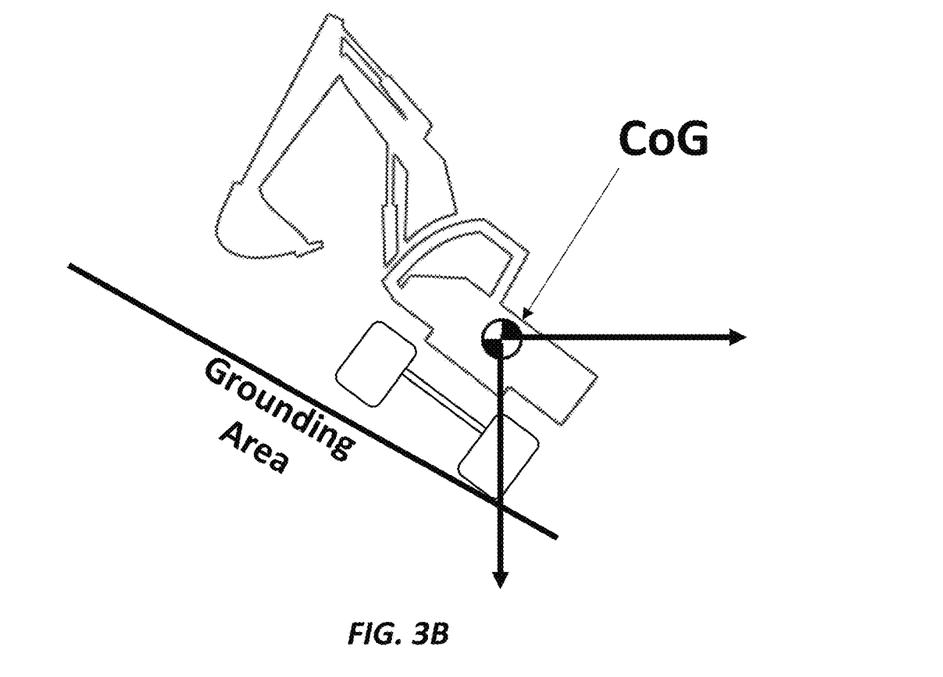

In step 250, a probability of rolling-over the vehicle may be determined based on the estimated CoG and the relative position of the vehicle with respect to the ground. For Example, the estimated CoG and the relative position may be used for calculating moments acting on vehicle 50. For example, the estimate relative position may indicate the direction of at least some of the forces acting on vehicle 50 at the location of the CoG, as illustrated by the arrows in FIG. 3B. In some embodiments, temporal changes in the estimated CoG and the estimated relative position may be used to determine if vehicle 50 is likely to rollover, as illustrated in FIG. 3B. For example, if the temporal changes in the GoC location the trajectory direction and the moment acting on vehicle 50 are such that the CoG is expected, if continue in the same task/direction, to cross a predetermined location that may cause vehicle 50 to rollover. Such a predetermined location may be determined by the manufacturer. In some embodiments, the temporal changes of the CoG may cause detachment of the lower portion (e.g., wheels/caterpillar tracks) from the ground, for example, when the position of the CoG moves towards or passes the predetermined location.

In some embodiments, when the probability of rolling over is higher than a threshold value, controller 120 may direct processor 52 of vehicle 50 to perform tasks that may prevent vehicle 50 from rolling over. For example, controller 120 may cause vehicle 50 to change its location, extend or fold the arm, unload the load and the like. In some embodiments, controller 120 may alert the operator operating vehicle 50 that the vehicle is likely to rollover if vehicle 50 would continue its task. In some embodiments, if the probability of rolling over is higher than a threshold value and the rolling over cannot be prevented, controller 120 may autonomously or by proposing actions to a user, conduct or propose actions that can minimize the damage caused by the rolling over. For example, when an excavator is about to roll over in a slope, controller 120 may swing the house of the excavator such that the boom, arm and bucket are facing the slope, thus may serve as a stopper for preventing further rolling of the excavator.

In yet another example, the probability of rolling-over may be calculated based on the minimum required energy for rolling the vehicles. In some embodiments, controller 120 may calculate the minimum required energy base on at least, the estimated CoG, the relative position of the vehicle with respect to the ground and the attitude. The attitude according to embodiments of the invention may be defined as the pitch and roll angle of the vehicle. The attitude may be extracted from analyzing the one or more images received from camera 110a and/or 110b. In some embodiments, controller 120 may estimate the position and the direction of the horizon line from the one or more images and may calculate the pitch and roll angle with respect to the horizon line.

Figure 4:
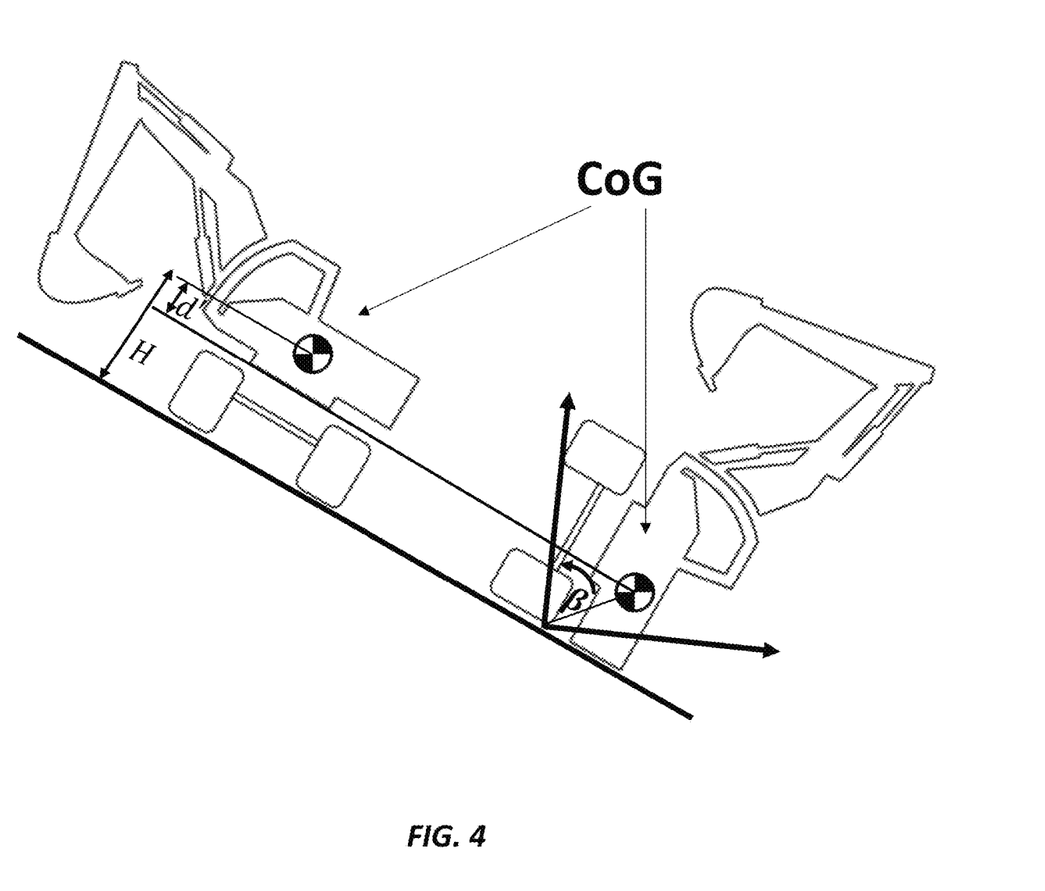
FIG. 4 is an illustration of a vehicle on a terrain according to some embodiments of the invention.

The minimum required energy for rolling the vehicles E may be calculated using the following equations and parameters as illustrated in FIG. 4

$$E = d' \times Mg = H(1 - \cos \beta) \times Mg \quad (1)$$

Wherein, M is the mass of the vehicle and the payload; H is the vertical distance of the CoG prior to rolling over with respect to the ground, d' is the vertical shift of the CoG during the rolling over of the vehicle, and $\beta$ is the rolling over the angle as illustrated in FIG. 4.

In some embodiments, additional data may be required, for example, the parameters of the vehicle. For some vehicles, such as excavators calculating the minimum required energy for rolling the vehicles may further required to calculate the swing angle between the crawler and the house. As should be understood by one skilled in the art, each type of vehicle may require different calculations and different parameters for calculating the minimum required energy and/or the probability.

In some embodiments, if the calculated minimum required energy is lower than a threshold value, meaning that vehicle (e.g., vehicle 50) has a high probability of rolling over, controller 120 may send an alert or may direct processor 52 of vehicle 50 to perform tasks that may prevent vehicle 50 from rolling over, as disclosed herein above.

In some embodiments, controller 120 may further be configured to estimate a distance of the vehicle from an obstacle or dangerous area. For example, the controller may estimate the distance of vehicle 50 from a cliff or a pit by analyzing images showing the hazard (e.g., obstacle or dangerous area) and a portion of the vehicle. Additionally or alternatively, controller 120 may receive the position of vehicle 50 from a GPS sensor and a topographic map containing the area's terrain/or one or more updated air photos of the area showing the terrains and the like. For example, knowing the current location of the vehicle and optionally the direction to which the vehicle is heading and comparing the location to known obstacle or dangerous area may allow to estimate if the vehicle is heading to a dangerous area.

In some embodiments, controller 120 may be configured to detect the activity of a user (e.g., operator) operating the vehicle. For example, second camera 110b may be located at the operator's cabin facing the operator, and controller 120 may use a visual detection algorithm in order to find: the presence of safety gear; the position of the operator, the operator activity (e.g., motion analysis, gesture recognition, action recognition), the operator's level of alertness (eye tracking/face expression analysis can be used to determine if the operator is sleepy or distracted and the like.

In some embodiments, controller 120 may be configured to: detect one or more objects near vehicle 50 and measure the distance of each of the one or more objects from the vehicle. In some embodiments, since the position of the vehicle relative to its surroundings may already be estimated (or received from a GPS sensor), vehicle 50 position in a three-demotion 3D space may be calculated. Furthermore, the controller may receive images showing objects in the surrounding of vehicle 50 captured by camera 110a and/or camera 110b, thus may measure the object's distance relative to the vehicle. If the object is moving (e.g., a human walking near vehicle 50) controller 120 may further determine the movement direction and may further determine if the moving object is approaching vehicle 50 or is drawing away from vehicle 50. For example, controller 120, may compare two or more time gapped images to see if the distance between the object and vehicle 50 increase or decrease, thus determining if the moving object approaches vehicle 50 or draws away from vehicle 50. Controller 120 may alert the operator of vehicle 50 if the object (stationary or moving) is closer than a predetermined distance, setting safety margins around vehicle 50. In some embodiments, controller 120 may prevent operations of vehicle 50 when such operations may result in collision of vehicle 50 or a part thereof with an object in its surroundings that is identified as hazardous, such as a human, trees, walls etc.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for preventing rolling-over of vehicles, comprising:
    at least one camera attached to a portion of the vehicle such that images captured by the at least one camera includes a portion of the vehicle and a portion of a surrounding area;
    a communication module; and
    a controller configured to:
        receive from the at least one camera, via the communication module, a stream of images comprising both a portion of the vehicle and a portion of a surrounding area;
        receive data related to parameters of the vehicle;
        calculate a relative temporal position between the vehicle and the ground, based on the received stream of images comprising both a portion of the vehicle and a portion of a surrounding area;
        calculate a temporal location of the vehicle's center of gravity (CoG) based on the received stream of images and the data related to the parameters of the vehicle, wherein the calculating comprises:
            receiving a location of the CoG of vehicle's mobility unit from a database;
            estimating a posture of the vehicle task-preforming unit, relative to one of: a fixed portion of the vehicle and the ground, from the stream of images;
            estimating a payload mass from the stream of images; and
            calculating a temporal change in the location of the vehicle's center of gravity based on the location of the CoG of vehicle's mobility unit, the posture of the vehicle task-preforming unit and payload mass; and
        determine a probability of rolling-over of the vehicle by calculating an energy of rolling the vehicle by, determining a temporal tilting angle between a normal to the ground area passing through the temporal CoG and a gravity vector passing through the temporal CoG, the mass of the payload, a mass of the vehicle, and the relative temporal position between the vehicle and the ground, when the probability exceeds a threshold value, execute at least one of: sending a message to an external device associated with an operator of the vehicle, and controlling at least one of: the vehicle or at least one of the vehicle's parts.

2. The system of claim 1, wherein the received at least one image further includes a portion of a load carried by the vehicle and the received parameters include parameters related to the load.

3. The system of claim 1, wherein the controller is further configured to:
calculate a velocity of the vehicle's center of gravity based on the received at least one image and the data related to the parameters of the vehicle; and
determine the probability of rolling-over the vehicle also based on the calculated center of gravity's velocity.

4. The system of claim 1, wherein the controller is further configured to:
receive a stream of images from the at least one camera, while the vehicle is on the move travelling;
identify temporal changes in at least one of: the relative position and the location of the vehicle's center of gravity, a relative posture of the vehicle and a position and posture of a load carried by the vehicle;
determine the probability of rolling-over of the vehicle based on the temporal changes; and
preventing the vehicle from rolling-over, while the vehicle is travelling, if the probability is higher than a threshold value.

5. The system of claim 1, wherein the controller is configured to calculate the location of the center of gravity from the analyzed images by:
estimating a posture of the vehicle;
receive data related to dimensions of the vehicle; and
estimating a load of the vehicle.

6. The system of claim 1, wherein the vehicle's parameters comprises at least one of: dimensions of the vehicle; dimensions of a load carried by the vehicle; a moment of inertia of the vehicle; mass of each part; motor parameters; and a mathematical model representing the dynamics between inputs and output of the dynamic elements of the vehicle.

7. The system of claim 6, wherein at least some of the vehicle's parameters are received from a database.

8. The system of claim 6, wherein at least some of the vehicle's parameters are extracted from the received at least one image.

9. The system of claim 1, wherein the controller is configured to calculate the relative position between the vehicle and the ground from the analyzed images by:
determining a tilting angle of the vehicle with respect to the ground; and
calculating a swing angle.

10. The system of claim 1, further comprising one or more sensor, and wherein the controller is configured to determine the probability of rolling-over of the vehicle based on data received from the one or more sensors.

11. The system of claim 1, wherein the at least one camera is located on a portion of the vehicle, affixed in a static configuration when the vehicle is stationary.

12. The system of claim 1, wherein the at least one camera is located at a predetermined location on the vehicle.

13. The system of claim 1, wherein the controller is configured to:
detect an input from a user operating the vehicle.

14. A method of preventing rolling-over of vehicles, comprising:
receiving from at least one camera attached to a portion of the vehicle, a stream of images that includes a portion of the vehicle and a portion of surrounding area;
receiving data related to parameters of the vehicle;
calculating a relative temporal position between the vehicle and the ground, based on the received stream of images comprising both a portion of the vehicle and a portion of a surrounding area;
calculating a temporal location of the vehicle's center of gravity (CoG) based on the received stream of images and the data related to the parameters of the vehicle, wherein the calculating comprises:
receiving a location of the CoG of vehicle's mobility unit from a database;
estimating a posture of the vehicle task-preforming unit, relative to one of: a fixed portion of the vehicle and the ground, from the stream of images;
estimating a payload mass from the stream of images; and
calculating a temporal change in the location of the vehicle's center of gravity based on the location of the CoG of vehicle's mobility unit, the posture of the vehicle task-preforming unit and payload mass; and
determining a probability of rolling-over of the vehicle by calculating an energy of rolling the vehicle by, determining a temporal tilting angle between a normal to the ground area passing through the temporal CoG and a gravity vector passing through the temporal CoG, the mass of the payload, a mass of the vehicle, and the relative temporal position between the vehicle and the ground,
when the probability exceeds a threshold value, executing at least one of: sending a message to an external device associated with an operator of the vehicle, and controlling at least one of: the vehicle or at least one of the vehicle's parts.

15. The method of claim 14, wherein the received at least one image further includes a portion of a load and the received parameters include parameters related to the load.

16. The method of claim 14, further comprising:
calculating a velocity of the vehicle's center of gravity based on the received at least one image and the data related to the parameters of the vehicle; and
determining the probability of rolling-over the vehicle also based on the calculated center of gravity's velocity.

17. The method of claim 14, further comprising:
receiving a stream of images from the at least one camera, whilst the vehicle is travelling;
identifying temporal changes in the relative position and the location of the vehicle's center of gravity, the relative posture of the vehicle and the position and posture of a load carried by the vehicle;
determining the probability of rolling-over of the vehicle based on temporal changes; and
preventing the vehicle from rolling-over, while the vehicle is travelling, if the probability is higher than a threshold value.

18. The method of claim 14, further comprising:
receiving a stream of images from the at least one camera, while the vehicle is travelling;
identifying temporal changes in the relative position and the location of the vehicle's center of gravity;
determine the probability of rolling-over of the vehicle based on temporal changes; and preventing the vehicle from rolling-over, while the vehicle is travelling, if the probability is higher than a threshold value.

19. The method of claim 14, wherein the controller is configured to calculate the location of the center of gravity from the analyzed images by:

estimating a posture of the vehicle;
receiving data related to dimensions of the vehicle; and
estimating a load of the vehicle.

* * * * *